3,839,364
OXIDATION OF THE DIASTEREOISOMERS
OF ZEARALANOL
Vernon V. Young, Terre Haute, Ind., assignor to Commercial Solvents Corporation, Terre Haute, Ind.
No Drawing. Application Jan. 29, 1971, Ser. No. 111,149, which is a continuation of application Ser. No. 752,761, Aug. 15, 1968, which in turn is a continuation-in-part of application Ser. No. 663,498, Aug. 28, 1967, all now abandoned. Divided and this application Mar. 9, 1973, Ser. No. 339,651
Int. Cl. C07d 9/00
U.S. Cl. 260—343.2 F        2 Claims

ABSTRACT OF THE DISCLOSURE

Zearalanol is oxidized to zearalanone by means of an oxidizing agent such as chromic acid and chromates of alkali metals. The chromic acid, preferably as chromic anhydride in sulfuric acid, is added to an organic solution of zearalanol. The chromates are also preferably employed in solution. The zearalanol can be either of the diastereoisomers of zearalanol or a mixture thereof. This process is particularly useful where it encompasses separating the high melting diastereoisomer of zearalanol from the low melting diastereoisomer of zearalanol by means of glacial acetic acid and then oxidizing the low melting diastereoisomer of zearalanol to zearalanone. After the oxidation reaction, the solution is diluted with water and aged at a reduced temperature to separate the water-insoluble zearalanone. The resultant zearalanone can be re-hydrogenated to a mixture of the diastereoisomers of zearalanol.

---

This application is a division of application Ser. No. 111,149, filed Jan. 29, 1971, now abandoned, which in turn is a continuation of Application Ser. No. 752,761, filed Aug. 15, 1968, now abandoned, which in turn is a continuation-in-part of application Ser. No. 663,498, filed Aug. 28, 1967, now abandoned.

BACKGROUND OF THE INVENTION

1. Field of the Invention

This invention relates to a process for oxidizing the diastereoisomers of zearalanol to zearalanone. This process also relates to a process for separating the high melting diastereoisomer of zearalanol from the low melting diastereoisomer of zearalanol and then oxidizing the low melting diastereoisomer to zearalanone. The terms zearalanol and zearalanone conform with the nomenclature in an article in Tetrahedron Letters, Pergamon Press, Ltd., No. 27, pp. 3109–14 (1966).

2. Description of the Prior Art

The use of chromic acid to oxidize certain secondary acetylenyl-carbinols to the corresponding ketones is described in Bowden et al., Researches on Acetylenic Compounds, Part I, J. Chem. Soc. (1946), pp. 39–45.

When zearalenone, having the formula:

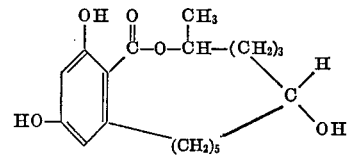

is converted to zearalanol, having the formula:

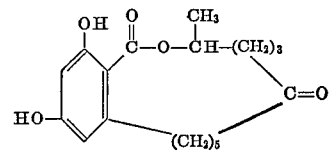

by reduction of the olefinic bond and the ketone group in the presence of hydrogen, a mixture of diastereoisomers of zearalanol is formed. This reduction is disclosed in U.S. Pat. No. 3,239,345, issued on Mar. 8, 1966. A portion of the high melting diastereoisomer can be separated out utilizing a procedure disclosed in Example VI of U.S. Pat. No. 3,239,345. The remaining zearalanol still comprises a mixture, although not in equal molar portions, of high melting and low melting diastereoisomers. It can be desirable in some instances to further separate the mixture of diastereoisomers and to produce only one diastereoisomer and hence a process for recycling to extinction is advantageous.

SUMMARY OF THE INVENTION

This invention is a method of preparing zearalanone, which has the formula:

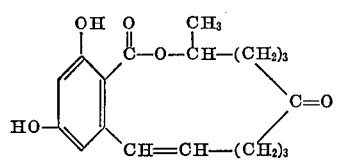

from zearalanol, which has the formula:

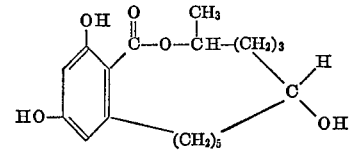

which comprises:
(a) Slowly reacting an oxidizing agent to oxidize the

group to a

group with an organic solution of zearalanol; (b) diluting the solution with sufficient water to separate the zearalanone from the solution as a precipitate; and (c) separating the precipitated zearalanone from the solution. Suitable oxidizing agents include chromic acid and the chromates of alkali metals. Specific oxidizers which are preferred include chromic acid and sodium and potassium dichromates.

The organic solution of zearalanol can contain either of the diastereoisomers or a mixture thereof.

The organic solvent for the zearalanol is preferably acetone since in it the oxidation proceeds at a faster rate but the organic solvent can be any solvent compatible with the reactants and somewhat miscible with water including ketones, especially lower ketones such as dimethylketone, methylethylketone, and diethylketone, and lower alkanoic acids such as warm acetic acid.

The oxidizing agent can be advantageously employed in solution. The concentration of a chromic acid solution is as high as possible to prevent separation of the zearalanol and/or zearalanone. The concentrated aqueous chromic acid is preferably added to the zearalanol solution as a solution of chromic anhydride (CrO$_3$) in concentrated sulfuric acid. The chromic acid is added to concentrated, i.e. 95% sulfuric acid and sufficient water is added to provide a homogeneous solution. An excess of the chromic acid can be used to speed up the oxidation.

The chromic acid solution is added slowly and the reaction temperature (i.e., acetone solution temperature) is maintained between about 20° and about 30° C. The chromic acid addition can extend over a period of from about ¼ hour to about 8 hours. The temperature and the rate of addition of the chromic acid solution can be adjusted so that the reaction proceeds at a reasonable rate without any appreciable excess of oxidizing agent ever being present in the reaction medium. The zearalanol solution is preferably stirred at all times during the addition to facilitate the reaction. After addition is complete, the solution is further stirred, preferably for about 30 minutes. The chromates of alkali metals are employed in a similar manner.

After the oxidation reaction is completed, the resulting solution is diluted with sufficient water to separate the zearalanone from the solution as a precipitate. The water dilution also serves to re-dissolve any chromium salts. The water dilution is ordinarily with from about three to about five volumes of water per volume of acetone used. The solution is then allowed to stand or age at a temperature between about 20° C. and about 30° C., preferably between about 25° and about 27° C., for a period of time sufficient for the zearalanone to separate as a precipitate, ordinarily between about 10 minutes and about 24 hours, although usually about one-half hour. The precipitated zearalanone is recovered from the aged solution by any convenient method, such as filtration. The precipitated zearalanone is in a crude form and can be purified, for example, by re-crystallization from hot methanol.

Zearalanone is useful as an anabolic and estrogenic substance for oral and parenteral administration to animals in the manner disclosed in U.S. Pat. No. 3,196,019 issued July 20, 1965. Also, zearalanone can be hydrogenated by the method of reduction or hydrogenation disclosed in U.S. Pat. No. 3,239,345, issued Mar. 8, 1966.

This invention also relates to a process for separating the low melting disastereoisomer of zearalanol from a mixture of the high melting and low melting diastereoisomers and oxidizing the low melting diastereoisomer of zearalanol to zearalanone which in turn is hydrogenated to form more of the mixture of diastereoisomers the high melting diastereoisomer being recovered and the low melting diastereoisomer being recycled to extinction. This process comprises (a) dissolving the mixture of diastereoisomers of zearalanol in warm glacial acetic acid preferably the warm acetic acid is from room temperature to above 50° C., (b) cooling the solution, (c) separating the crystals of low melting diastereoisomer of zearalanol from the solution preferably the solution is cooled at least 20° C., (d) dissolving the low melting diastereoisomer in an organic solvent, (e) slowly adding and reacting a concentrated aqueous solution of chromic acid or a chromate of an alkali metal with the organic solution of the low melting diastereoisomer, (f) diluting the solution with water, (g) holding the solution at a temperature between about 20° and about 30° C. for from 10 minutes to 24 hours to separate the zearalanone from the solution as a precipitate and (h) separating the precipitated zearalanone from the solution.

A mixture of the high melting and low melting diastereoisomers of zearalanol resulting from the reduction of zearalanone to zearalanol disclosed in U.S. Pat. No. 3,239,345, issued Mar. 8, 1966, can be separated due to their varying solubilities in glacial acetic acid as disclosed in my copending application Ser. No. 643,819 filed on June 6, 1967, now U.S. Pat. 3,574,235, entitled "Separation of a Mixture of Diastereoisomers of Zearalanol." The mixture of diastereoisomers can be dissolved in glacial acetic acid in a ratio of mixture to acid of between about 10 grams per 100 ml. and about 20 grams per 100 ml., preferably about 15 grams per 100 ml.

DETAILED DESCRIPTION OF THE INVENTION

A racemic mixture of zearalanol can be prepared by, first, preparing and purifying zearalanone as described in Examples II and III of U.S. Pat. No. 3,239,345, issued Mar. 8, 1966, and then reducing the zearalanone to zearalanol as follows:

One gram of zearalanone was reduced in 150 cc. of ethanol at room temperature and 50 p.s.i. of hydrogen for four hours in the presence of a small amount of Raney nickel (about 1 cc. of a thick suspension in water). The product was concentrated, treated with 5 milliliters of isopropyl alcohol, cooled and filtered. The filtrate was mixed with 5 milliliters of water, left standing overnight, cooled and filtered to provide 0.65 gram of product having a melting point of 147°–157° C. This product was re-crystallized from isopropyl alcohol-water mixtures two times to provide 0.18 gram of a product having a melting point of 178°–180° C. A product having a melting point of 146°–148° C. and weighing 0.22 gram was also recovered from the filtrate after the first recrystallization of the product weighing 0.65 gram. The reduction of the ketone group introduces an asymmetric carbon atom and makes diastereoisomers possible. The optical activities of the two products were (1) for the product with a melting point of 178°–180° C., $[\alpha]_D^{25}$=about +46° eq. and (2) for the product with a melting point of 146°–148° C., $[\alpha]_D^{25}$=about +39° eq. where $$[\alpha] = \frac{.100}{c \cdot l},$$

$c=1\%$ in methanol and $l=2$ dcm.

Product (1) is the pure high-melting diastereoisomer of zearalanol. Product (2), which has a melting point of 146°–148° C., is a mixture of two diastereoisomers of zearalanol, wherein the diastereoisomers are not present in equal molar amounts.

The process for oxidizing the mixture of high melting and low melting diastereoisomers of zearalanol to zearalanone is described more particularly in the following specific examples.

EXAMPLE I 24.0 grams of a mixture of diastereoisomers of zearalanol similar to product (2) were placed in 120 ml. of acetone with constant stirring. A solution of chronic acid was prepared by dissolving 5.5 grams of chromium trioxide (CrO$_3$) and 4.5 ml. of sulfuric acid (95% by weight) in 15 ml. of water. The chronic acid solution was slowly added (over a one-hour period) to the acetone solution of zearalanol at a temperature of 20°–25° C. with constant stirring. [It may be desirable to use a nitrogen atmosphere for safety purposes.] The mixture was diluted with three volumes of water (based on the acetone) and held (aged) for two hours at a temperature of 25°–27° C. The resulting precipitate was filtered out and dried. The precipitate weighed 22.0 grams and had a melting point of 180°–190° C. The precipitate was dissolved in hot methanol (one gram per 8 ml. of methanol), filtered and aged at 0°–5° C. for 24 hours. The recrystallized precipitate was zearalanone, weighed 11.8 grams and had a melting point of 191°–193° C.

EXAMPLE II 24.0 grams of a mixture of diastereoisomers of zearalanol were placed in 120 ml. of acetone with constant stirring. A solution was prepared by dissolving 5.5 grams of chromium trioxide and 4.5 ml. of sulfuric acid (95% by weight) in 15 ml. of water. The chronic acid solution was slowly added (over a one-hour period) to the acetone solution of zearalanol at a temperature of 20°–25° C. with constant stirring. The mixture was stirred for one-half hour. The mixture was diluted with three volumes of water (based on the acetone) and held (aged) for one-half hour at a temperature of 25°–27° C. The precipitate was filtered out and dried. The precipitate weighed 21.8 grams and had a melting point of 180°–185° C. The precipitate was dissolved in hot methanol (one gram per 8 ml. of methanol), filtered and aged at 0°–5° C. for 24 hours. The recrystallized precipitate was zearalanone, weighed 13.0 grams and had a melting point of 193°–194° C.

EXAMPLE III 24.0 grams of a mixture of diastereoisomers of zearalanol were placed in 120 ml. of acetone with constant stirring. A solution was prepared by dissolving 5.5 grams of chromium trioxide and 4.5 ml. of sulfuric acid (95% by weight) in 15 ml. of water. The chromic acid solution was slowly added (over a one-hour period) to the acetone solution of zearalanol at a temperature of 20°–25° C. with constant stirring. The mixture was stirred for one-half hour. The mixture was diluted with three volumes of water (based on the acetone) and held (aged) for 18 hours at a temperature of 25°–27° C. The precipitate was filtered out and dried. The precipitate weighed 21.5 grams and had a melting point of 180°–185° C. The precipitate was dissolved in hot methanol (one gram per 8 ml. of methanol), filtered and aged at 0°–5° C. for 24 hours. The recrystallized precipitate was zearalanone, weighed 11.5 grams and had a melting point of 192°–193° C.

The process for separating the low-melting diastereoisomer of zearalanol from a mixture of the diastereoisomers and oxidizing the low melting diastereoisomer to zearalanone is described in the following examples.

EXAMPLE IV 100 grams of a mixture of the diastereoisomers of zearalanol and one liter of glacial acetic acid were placed in a two liter flask. The mixture was warmed to dissolve the zearalanols, cooled to room temperature and allowed to stand at 28° C. for 24 hours. The resultant crystals were separated by filtration from solution, rinsed with petroleum ether and dried. The dried crystals weighed 52.4 grams and had a melting point of 150°–155° C. A sample was further dried and the melting point was 153°–155° C. The total material was recrystallized from chloroform. The material weighed 38.0 grams and had a melting point of 155°–157° C. This material was the pure low-melting diastereoisomer of zearalanol.

The acetic acid filtrate was stirred and diluted with three volumes of water. The resultant precipitate was isolated by filtration, rinsed with water and dried. The precipitate weighed 41.4 grams. The precipitate was recrystallized from a solution comprised of 1400 ml. of methanol and 100 ml. of water. The recrystallized precipitate weighed 25.0 grams and had a melting point of 180°–181° C. This material was the pure high-melting zearalanol.

24.0 grams of the low-melting diastereoisomer of zearalanol were placed in 120 ml. of acetone with constant stirring. A solution was prepared by dissolving 5.5 grams of chromium trioxide and 4.5 ml. of sulfuric acid (95% by weight) in 15 ml. of water. The chromic acid solution was slowly added (over a one-hour period) to the zearalanol solution at a temperature of 20°–25° C. with constant stirring. The mixture was stirred for one-half hour. The mixture was diluted with three volumes of water (based on the acetone) and held (aged) for two hours at a temperature of 25°–27° C. The precipitate was filtered out and dried. The precipitate weighed 18.6 grams and had a melting point of 185°–186° C. The precipitate was dissolved in hot methanol (one gram per 8 ml. of methanol), filtered and aged at 0°–5° C. for 24 hours. The recrystallized precipitate was zearalanone, weighed 9.8 grams and had a melting point of 194°–195° C.

EXAMPLE V 24.0 grams of the low-melting diastereoisomer of zearalanol were placed in 120 ml. of acetone with constant stirring. A solution was prepared by dissolving 5.5 grams of chromium trioxide and 4.5 ml. of sulfuric acid (95% by weight) in 15 ml. of water. The chromic acid solution was slowly added (over a one-hour period) to the zearalanol solution at a temperature of 20°–25° C. with constant stirring. The mixture was stirred for one-half hour. The mixture was diluted with three volumes of water (based on the acetone) and held (aged) for one-half hour at a temperature of 25°–27° C. The precipitate was filtered out and dried. The precipitate weighed 19.1 grams and had a melting point of 185°–186° C. The precipitate was dissolved in hot methanol (one gram per 8 ml. of methanol), filtered and aged at 0°–5° C. for 24 hours. The recrystallized precipitate was zearalanone, weighed 9.2 grams and had a melting point of 193°–195° C.

The following example illustrates the use of a chromate salt.

EXAMPLE VI

A solution of 3.0 grams of potassium dichromate and 2.5 ml. of sulfuric acid in 10 ml. of water was added to a stirred solution of 9.7 grams of zearalanol in 50 ml. of acetone. After the addition of the dichromate solution was complete, the reaction mixture was stirred for 30 minutes at a temperature of 25°–30° C. The resulting reaction mixture was diluted with water (five volumes) and the precipitated zearalanone removed by filtration. The crude zearalanone was recrystallized from aqueous acetone to provide 6.5 grams of zearalanone having a melting point of 185°–190° C.

It is claimed:

1. A process for producing the high melting diastereoisomer of zearalanol which comprises (I) separating the low melting diastereoisomer of zearalanol from a mixture of the high melting and low melting diastereoisomers of zearalanol by (a) dissolving the mixture of diastereoisomers in warm glacial acetic acid, (b) cooling the solution and precipitating crystals of the low melting diastereoisomer of zearalanol, (c) separating the crystals of low melting diastereoisomer of zearalanol from the solution, (d) diluting the solution with water and precipitating crystals of the high melting diastereoisomer of zearalanol, (e) recovering the crystals of high melting diastereoisomer of zearalanol from the solution; (II) oxidizing the separated low melting diastereoisomer of zearalanol to zearalanone by (f) dissolving the low melting diastereoisomer in an organic solvent, (g) slowly adding a concentrated aqueous solution of chromic acid to the organic solution of the low melting diastereoisomer, (h) diluting the solution with sufficient water to separte the zearalanone from the solution as a precipitate, (i) separating the precipitated zearalanone from the solution; (III) reducing the separated zearalanone to a mixture of the high melting and low melting diastereoisomers of zearalanol by catalytic hydrogenation; and (IV) repeating steps I, II and III whereby the low melting diastereoisomer is recycled to extinction.

2. The method of claim 1 wherein in step (a) the warm acetic acid is from room temperature to above 50° C.; in step (b) the solution is cooled at least 20° C.; in step (d) the solution is diluted with about 3 volumes of water per volume of solution; in step (f) the organic solvent is acetone; and in step (h) the solution is diluted with about 3 to 5 volumes of water per volume of acetone.

References Cited

UNITED STATES PATENTS 3,574,235   4/1971   Young _____ 260—343.2

JOHN M. FORD, Primary Examiner